United States Patent [19]

Cherukuri et al.

[11] 4,250,195

[45] Feb. 10, 1981

[54] METHOD FOR APPLYING SOFT FLEXIBLE SUGAR COATING TO FRESH CHEWING GUM AND COATED CHEWING GUM PRODUCT

[75] Inventors: Subraman R. Cherukuri; Dominick R. Friello, both of Danbury, Conn.

[73] Assignee: Life Savers, Inc., New York, N.Y.

[21] Appl. No.: 78,115

[22] Filed: Sep. 24, 1979

[51] Int. Cl.$^3$ .............................................. A23G 3/30
[52] U.S. Cl. ...................................... 426/5; 426/291; 426/292; 426/305; 426/103
[58] Field of Search .................. 426/3, 5, 6, 4, 103, 426/291, 292, 295, 303, 305

[56] References Cited

U.S. PATENT DOCUMENTS

| | | | |
|---|---|---|---|
| 146,541 | 1/1874 | Moore | 426/5 |
| 2,304,246 | 12/1942 | Ekert | 426/5 |
| 3,456,050 | 7/1969 | Rieckmann et al. | 426/5 |
| 3,635,735 | 1/1972 | Patil | 426/5 |
| 3,912,817 | 10/1975 | Sapsowitz | 426/5 |
| 4,127,677 | 11/1978 | Fronczkowski et al. | 426/5 |

OTHER PUBLICATIONS

Little, et al. Tablet Making, The Northern Pub. Co. Ltd., Liverpool, England, pp. 99-105.

*Primary Examiner*—Jeanette M. Hunter
*Attorney, Agent, or Firm*—Lawrence S. Levinson; Burton Rodney

[57] ABSTRACT

A new method is provided for applying a soft flexible sugar coating to soft chewing gum pieces which method requires that a sugar coating be applied to fresh soft chewing gum substantially immediately (within 3 hours) after the chewing gum is prepared and without first subjecting such chewing gum to the normal 24 to 48 hour conditioning period. The resulting coating takes the form of a continuous soft flexible protective shell which tightly adheres to the soft chewing gum piece, locks in freshness and imparts a long-shelf life thereto. The chewing gum piece produced by the above method remains soft even after prolonged periods of storage.

The coated chewing gum produced by the above method is also provided.

10 Claims, No Drawings

METHOD FOR APPLYING SOFT FLEXIBLE SUGAR COATING TO FRESH CHEWING GUM AND COATED CHEWING GUM PRODUCT

BACKGROUND OF THE INVENTION

Candy- or sugar-coated chewing gums are well known in the art. The sugar-based coatings may be applied to chewing gum employing procedures such as described in U.S. Pat. Nos. 3,554,767 to Daum et al, 2,304,246 to Ekert, 2,460,698 to Lindhe, 3,208,405 to Beer, and 3,635,735 to Patil.

Generally, prior to coating chewing gum pieces by conventional coating procedures, the chewing gum pieces must be first subjected to a long, time-consuming conditioning or aging period of upwards of 24 to 48 hours or more to be certain that the sugar coating to be applied will uniformly adhere to the chewing gum pieces. A discussion of this problem and the fact that shortening of the aging period is not an acceptable solution is set out in column 1 of U.S. Pat. No. 3,635,735 to Patil. Patil's solution is using an accelerated process which includes evaporative cooling of gum mass initially prepared at an elevated temperature by mixing wet saccharides, such as corn syrup or table sugar combined with water with molten gum base centers, at an elevated temperature to coat the gum base centers and vacuum drying the gum centers at various stages of coating.

FIELD OF THE INVENTION

The present invention relates to a method for coating soft fresh unconditioned chewing gum pieces with a continuous soft flexible sugar shell or coating which tightly adheres to the soft chewing gum piece and maintains softness and freshness of the chewing gum piece even after prolonged storage, and to the coated chewing gum piece produced thereby.

DESCRIPTION OF THE INVENTION

In accordance with the present invention, there is provided a method for coating soft fresh chewing gum pieces, which have not been previously subject to the long time-consuming conventional conditioning period mentioned above, with a soft continuous flexible protective shell or coating which is bound tightly to each chewing gum piece to lock in freshness and maintain the chewing gum pieces in a soft state even after extended periods of storage. Surprisingly and unexpectedly and contrary to conventional coated chewing gum manufacturing practices, it has been found that in accordance with the method of the invention, a tightly adhering continuous uniform sugar coating may be applied to chewing gum pieces almost immediately after the chewing gum pieces have been prepared and while they still are fresh and in softened condition.

The technique employed in accordance with the present invention for applying a tightly adhering uniform continuous soft flexible sugar coating to soft fresh chewing gum pieces includes the steps of applying to the chewing gum pieces (also referred to as centers) while in a softened condition and only after 1 to 4 hours, and preferably only after 2 to 2½ hours, after such chewing gum pieces have been formed, a first coating syrup (also referred to as a grossing syrup) which contains a sugar sweetener, an adhesion or binder component and, optionally, a film-forming component, to thereby coat the centers with the first coating syrup, and then applying a dusting mix to the centers coated with the first coating syrup, the dusting mix including one or more sugar sweeteners, such as employed in the first coating syrup, in powdered form. If desired, in a preferred embodiment, after conditioning the gross coated centers for 8 hours or more, a second coating syrup or finishing syrup may be applied to smooth out the coating of the centers and provide a shine thereto, which second coating syrup generally includes ingredients similar to that present in the first coating syrup, but need not contain an adhesion or binder component. Application of the second coating syrup may be repeated as many times as necessary to build up a desired coating weight and thickness to smooth out the coating and provide the desired shine thereto.

Prior to application of the second coating syrup, the steps of applying the first coating syrup and dusting mix will be repeated, as many times as necessary, to build up a desired coating weight and thickness on the centers.

In carrying out the method of the invention, first coating syrup or grossing syrup will be formed as an aqueous solution of the (a) sweetener (or bulking agent), (b) adhesion or binder component, and optionally, but preferably, (c) film-forming agent. The sweetener (or bulking agent) in the form of an aqueous syrup (a) may be present in an amount within the range of from about 50% to about 95%, preferably from about 60 to about 90% by weight of the first coating syrup, and as a solid will be present in an amount within the range of from about 60 to about 88% by weight and preferably from about 70 to about 80% by weight of the first coating syrup. The binder (b) may be present in an amount within the range of from about 5 to about 20%, preferably from about 8 to about 15% by weight of the first coating syrup; and the film-forming agent (c) may be present in an amount within the range of from about 0 to about 10% and preferably from about 4 to about 8% by weight of the first coating syrup. The first coating syrup will also contain from about 10 to about 40%, and preferably from about 15 to about 25% water.

The first coating syrup or grossing syrup functions as a wet base layer to which later-deposited dry sweetener or bulking agent (present in the dusting mix) may adhere or be absorbed on to form the desired coating.

Examples of sugar sweeteners or bulking agents suitable for use in the first coating syrup may comprise substantially any known sugar sweetener, such as arabinose, xylose, ribose, glucose, mannose, galactose, fructose, or sorbose, beet sugar or sucrose, lactose, maltose or cellobiose as well as corn syrup solids, and combinations thereof, with sucrose being preferred. The sweetener or bulking agent will preferably be employed in the form of a warm syrup (130° to 175° F.) such as sugar or glucose syrup, corn syrup, and the like, and mixtures thereof, with a mixture of glucose syrup and corn syrup being preferred. The water present in such syrups will account for the water component mentioned above.

The adhesion component or binder employed in the first coating syrup aids in initially binding the sweetener to the comestible being coated. Examples of binders suitable for use herein include gum arabic, xanthan gum, gum tragacanth, tapioca dextrin, or modified food starch, with gum arabic being preferred.

An optional but important and preferred component of the first coating syrup is the film-forming agent which enables the deposition of a substantially uniform layer of the sweetener on the comestible being coated.

Examples of film-forming agents suitable for use herein include gelatin, methyl cellulose, hydroxypropyl cellulose, ethyl cellulose, hydroxyethyl cellulose, and/or carboxymethyl cellulose.

The dusting mix comprises a dry powder mixture containing one or more sweeteners (or bulking agents).

As indicated, the sweetener (bulking agent) present in the dusting mix may include any of those employed in the first coating syrup and set out above. The preferred sweetener present in the dusting mix will be powdered sucrose alone or in combination with fine crystalline sugar.

In preferred embodiments, the weight ratio of the solids present in the first coating syrup to the dusting mix will range from about 3:1 to about 9:1.

Generally, a single deposition of each of the first coating syrup and the dusting mix may not be sufficient to provide the desired amount or thickness of coating deposited on the comestible. Accordingly, it usually will be necessary to apply second, third or more coats of each of the first coating syrup and dusting mix in order to build up the weight and thickness of the coating to desired levels. However, before applying subsequent layers of first coating syrup, the previously applied layers of first coating syrup are allowed to dry. For example, in coating chewing gum, the applications of first coating syrup and dusting mix are continued until the average gum piece weight reaches about 90% of the required coated weight. Thus, if the coating is to comprise about 35% by weight of the coated chewing gum tablet, application of 2 to 5 coats of each of the first coating syrup and dusting mix may be required.

It will be appreciated that the number of applications required will also vary depending upon the amount of solids present in the first coating syrup and the amount of dusting mix employed.

After a sufficient amount of coating has been applied to the pieces of chewing gum to be coated, the tablets are conditioned in an air-conditioned room maintained at a temperature of from about 62° to about 70° F. and a relative humidity of from about 25 to about 55% for 8 hours or more. The coating on the pieces may then be smoothed and otherwise finished by applying the second coating syrup (also referred to as the finishing syrup) to the pieces in as many applications as is necessary to achieve desired smoothness and shine.

The second coating or finishing syrup as indicated includes (a) sweetener (or bulking agent) preferably as an aqueous solution or syrup, as well as (b) hot water (temperature ranging from about 50° to about 75° C.). The sweetener component (a) in the second coating syrup will preferably be the same as the sweetener components in the first coating syrup with sugar or glucose syrup or a mixture of sugar syrup and corn syrup being preferred. The sweetener (bulking agent) (as a solid) will be present in the second coating syrup in an amount within the range of about 55 to about 85%, and preferably from about 65 to about 80% by weight of the second coating syrup. The second coating syrup will also contain from about 15 to about 40% by weight water and preferably from about 20 to about 35% by weight water.

It has been found that the presence of the liquid glucose in the coating keeps the coating soft and flexible until after the chewing gum piece is packaged. The presence of gum arabic in the coating is preferred in that it ensures that the coating will harden after 4 weeks or more, while the gum centers still remain soft and fresh.

Flavoring in the form of liquid flavor may be added with the first coating syrup and/or second coating syrup, while spray dried flavors may be added with the dusting mix. The flavoring will preferably be applied after an initial first coating syrup-dusting mix has been applied.

If desired, flavoring may be added to the gum base. The flavoring in the gum center will be present in an amount within the range of from about 0.5 to about 1.5%, and preferably from about 0.7 to about 1.2% by weight of the gum center. The flavoring in the coating will be present in an amount within the range of from about 0.5 to about 5% and preferably from about 1.25 to about 4% by weight of the coating. Such flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

Sweeteners may also be present in the gum base centers forming the gum, such sweeteners may comprise natural sweeteners or synthetic sugar substitutes.

Where employed, the synthetic sweeteners may be present in the chewing gum center in an amount within the range of from about 0.04 to about 2% and preferably from about 0.4 to about 0.8% by weight of the chewing gum. Examples of synthetic sweeteners suitable for use herein include free saccharin acid, sodium, calcium or ammonium saccharin, cyclamate salts, dihydrochalcones, glycyrrhizic acid and salts, L-aspartyl-L-phenylalanine methyl ester and mixtures thereof.

Where employed, natural sugars and/or natural sugar substitutes may be present in the chewing gum center in an amount within the range of from about 0.05 to about 90%, and preferably from about 10 to about 85% by weight of the chewing gum. Such natural sweeteners suitable for use herein include sugar alcohols, such as, sorbitol, xylitol, mannitol, isomaltitol, or maltitol. If desired, sugars such as sucrose or glucose may be employed.

The gum base will be present in an amount within the range of from about 10 to about 60%, and preferably from about 15 to about 45% by weight.

In general, the gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

The gum base may also include solvents, detackifiers, waxes, softening agents, lubricants, fillers, emulsifiers, colorants, antioxidants, and/or texturizers, bulking agents and other conventional ingredients as will be apparent to those skilled in the art. Examples of typical gum bases suitable for use herein are disclosed in U.S. Pat. Nos. 3,052,552 and 2,197,719.

A preferred coating, in accordance with the present invention, for a chewing gum will have the following composition.

| Ingredient | % by weight of coating |
|---|---|
| Sugar | 50 to 85 |
| Corn syrup 44° Be | 10 to 45 |
| Gum arabic | 0.25 to 3 |
| Gelatin | 0.25 to 3 |
| Color | 0.1 to 5 |

The following Examples represent preferred embodiments of the present invention.

EXAMPLES 1 AND 2

Sugar coated chewing gums having center or core portions as shown in Table I and coatings as shown in Table II below are prepared as follows.

TABLE I

| Composition of Gum Center or Core (present in all chewing gum Examples) | |
|---|---|
| ingredient | Parts by weight |
| Gum base | 24 |
| Sugar | 53.5 |
| Corn Syrup | 2.0 |
| Yelkin | 0.5 |
| Flavor | 2 |

TABLE II

Composition of Various Coating Mixtures Required for Forming Coating on Gum Centers of Table I

| | Parts by Weight | |
|---|---|---|
| Example No. | 1 | 2 |
| First Coating Syrup (Grossing Syrup) | | |
| Gum arabic solution (48%) | 6 | 10 |
| Gelatin solution (15%) | 6 | — |
| Sugar syrup 35° Be' (73%) | 65 | 65 |
| Corn syrup 44° Be' (78% solids) | 20 | 20 |
| Color solution | 2 | 2 |
| Dusting Mix | | |
| Powdered sugar | 50 | 100 |
| Fine crystalline sugar | 50 | 0 |
| Second Coating Syrup (Finishing Syrup) | | |
| Sugar syrup 35° Be' (73%) | 97 | 96 |
| Corn syrup 44° Be' (78% solids) | 1 | 2 |
| Color solution | 2 | 2 |

The chewing gum centers are prepared as follows:

Gum base is melted and maintained at a temperature within the range of 171°–180° F. Softener (lecithin) and corn syrup are added slowly with stirring. Sugar is added to the mix, mixed for 3 minutes, followed by the addition of flavor (oil and spray dried) and 3 minutes mixing.

The above mixture is stirred until homogeneous, cooled, rolled and scored and individual pieces or pillows are produced.

The coating mixtures are separately prepared. The first and second coating syrups are prepared by mixing the various ingredients, under heating if necessary, to form a solution.

The dusting mix is prepared by simply mixing the various ingredients and until a substantially homogeneous mixture is formed.

The fresh soft gum centers to be coated are allowed to sit for 2 hours and are placed in a standard revolving coating pan. Th gum pieces are dedusted using cool dry air. The first coating syrup mixed and warmed to a temperature of 120° F. is applied to the gum pieces. After about 2–3 minutes, the dusting mix is applied to the gum pieces coated with the first coating syrup. The gum pieces are allowed to roll for 4 minutes to absorb the dusting mix.

The above coating steps are repeated until the weight of an average gum piece reaches about 90% of the required coated weight. For example, if the required coated weight is 35%, 2 or 3 applications of the first coating syrup and dusting mix is needed.

After the required coating weight is attained, the coated gum pieces are tray dried and conditioned in an air-conditioned room for about 8 hours at a temperature of about 66° F. under a relative humidity of about 45%.

Thereafter, the coated gum pieces are loaded on the standard revolving coating pan. The second coating syrup is applied to the gum pieces. After 2–3 minutes, the gum pieces are allowed to rotate for 3–4 minutes.

The above finishing coating step may be repeated 2–3 times as desired until desired smoothness and shine are obtained.

If desired, liquid flavor may be pre-mixed with the first coating syrup and/or spray dried flavor may be pre-mixed with the dusting mix to impart desired flavor to the coating.

The so-coated gum pieces may then be polished and otherwise finished employing conventional means to produce chewing gum having a soft flexible continuous coating which tightly adheres to the centers. The coating remains soft for about 4 weeks and then hardens into a tough exterior while the chewing gum center still remains soft and fresh.

What is claimed is:

1. A method for preparing a sugar coated chewing gum, which comprises the steps of preparing fresh soft chewing gum center portions, allowing the fresh soft center portions to age for 1 to 3 hours, applying to said still soft and fresh chewing gum center portions a first coating syrup consisting essentially of an aqueous solution of a sugar material, corn syrup , a binder and optionally a film-forming agent, and applying to said so-treated center portions a coating dusting mix consisting essentially of a sugar material in dry form, at least a portion of said dry sugar material being absorbed on the first coating syrup applied to said center portions to form a continuous soft flexible coating which tightly adheres to said center portions, and further including the step of applying a second coating syrup to said center portions previously coated with said first coating syrup and said coating dusting mix, said second coating syrup consisting essentially of an aqueous solution of a sugar, and optionally corn syrup, and serving to smooth out and providing a shine to the coating of said sugar material previously applied to said center portions.

2. The method as defined in claim 1 wherein said steps of applying said first coating syrup and then applying said coating dusting mix are repeated, as necessary, to build up a coating of desired thickness on the center portions.

3. The method as defined in claim 1 wherein said first coating syrup contains a film-forming agent.

4. The method as defined in claim 1 wherein said first coating syrup comprises sugar syrup or liquid glucose, corn syrup, gum arabic solution and optionally gelatin solution, and said coating dusting mix comprises powdered sugar.

5. The method as defined in claim 1 wherein said center portion is sugarless chewing gum or sugar containing chewing gum.

6. A chewing gum having a soft flexible continuous sugar coating prepared by the method as defined in claim 1.

7. The chewing gum as defined in claim 6 wherein said sugar coating consists essentially of from about 50 to about 90% sugar, from about 5 to about 45% corn syrup solids and from about 1 to about 10% binder, all of said % being based on the total weight of the coating.

8. The chewing gum as defined in claim 7 wherein said binder for imparting cohesivity to the coating ingredients is gum arabic, xanthan gum, gum tragacanth, tapioca dextrin, or modified food starch.

9. The chewing gum as defined in claim 8 wherein said coating includes a film-forming agent which is gelatin, methyl cellulose, hydroxy-propyl cellulose, ethyl cellulose, hydroxyethyl cellulose, and/or carboxymethyl cellulose.

10. The chewing gum as defined in claim 6 in the form of a sugar coated bubble gum.

* * * * *